United States Patent Office.

ELIAS S. HUTCHINSON, OF BALTIMORE, MARYLAND.

Letters Patent No. 112,046, dated February 21, 1871.

IMPROVEMENT IN THE MANUFACTURE OF FLOUR.

The Schedule referred to in these Letters Patent and making part of the same.

I, ELIAS S. HUTCHINSON, of Baltimore, in the State of Maryland, have invented a new and improved Process for Producing Flour from Wheat and other Grains, of which the following is a specification.

Nature and Objects of the Invention.

My process consists in first grinding the grain in any usual and suitable manner, then removing the oil from it by a chemical agent, and after it has been dried bolting it as usual, or in any proper way.

The object in thus removing the oil after grinding and previous to bolting is to liberate the starch and all the valuable parts of the flour, so that they will be readily separated from the bran by the bolting-apparatus.

I thus avoid the necessity of grinding the meal so finely or with such severity as to pulverize the hull or injure the flour, and am also enabled to dispense with much of the rubbing action which is otherwise necessary to remove the flour, and which, under the ordinary process, still further pulverizes the bran and mixes the finer particles thereof with the flour.

General Description.

The usual process of making flour is to grind and then bolt several times—usually three times—that which passes the first bolting being the best grade of flour, and the last the lower grades.

The difference in the grades is owing chiefly to the presence of the hull, of which there is very little in the first bolt, as this first grinding is coarser and the hull is not ground, except partially, and does not pass through the bolt.

The following grindings pulverize the hull, and it is bolted through and gives a dark color to the flour; furthermore, the starch adheres so tenaciously to the hull that it only is released by the finest grinding, which also pulverizes the hull, as aforesaid. The great difficulty in removing the starch, &c., from the hull is owing to the presence of oil in the grain.

My process is as follows:

The grain is first ground to a sufficient extent to enable the chemical subsequently applied to permeate all parts of the meal, but not so finely as is necessary with the customary process.

I then place the meal in a suitable vat and introduce the liquid bisulphide of carbon or other suitable chemical, which, mingling with the oil in the meal, completely removes the said oil.

The mingled oil and chemical flow away together until all the oil is removed, after which the meal is dried preparatory to bolting, and the chemical is evaporated from the oil, and, together with that evaporated from the meal, is recondensed for future use.

It is unnecessary to more particularly describe any apparatus for removing oil from the meal and subsequently drying the latter, because I do not confine myself to any particular apparatus, but propose to use any of the various appliances that may be preferred.

An effective apparatus for this purpose will be found described in Letters Patent granted to me on the 17th day of January, 1871, to which reference is hereby made for further explanation. The mode of evaporating and recondensing the chemical is also well known.

I have discovered that by thoroughly removing the oil by means of the bisulphide of carbon or other suitable chemical agent from meal which has been ground, not so as to pulverize the hull, but sufficiently to expose the starch globules to the action of the chemical and subsequently drying the meal, as above described, the particles of flour are liberated from each other, the bond of union between them being entirely removed.

A simple bolting of the meal will then effect a perfect separation of the flour, so that it is almost all saved as first grade.

Claim.

I claim as my invention—

As an improvement in the manufacture of flour from wheat or any grain, removing the oil from the meal by a chemical agent after grinding and prior to bolting, substantially as explained.

ELIAS S. HUTCHINSON.

Witnesses:
 WM. H. BRERETON, Jr.,
 H. C. ELLIOTT.